Figure 1:
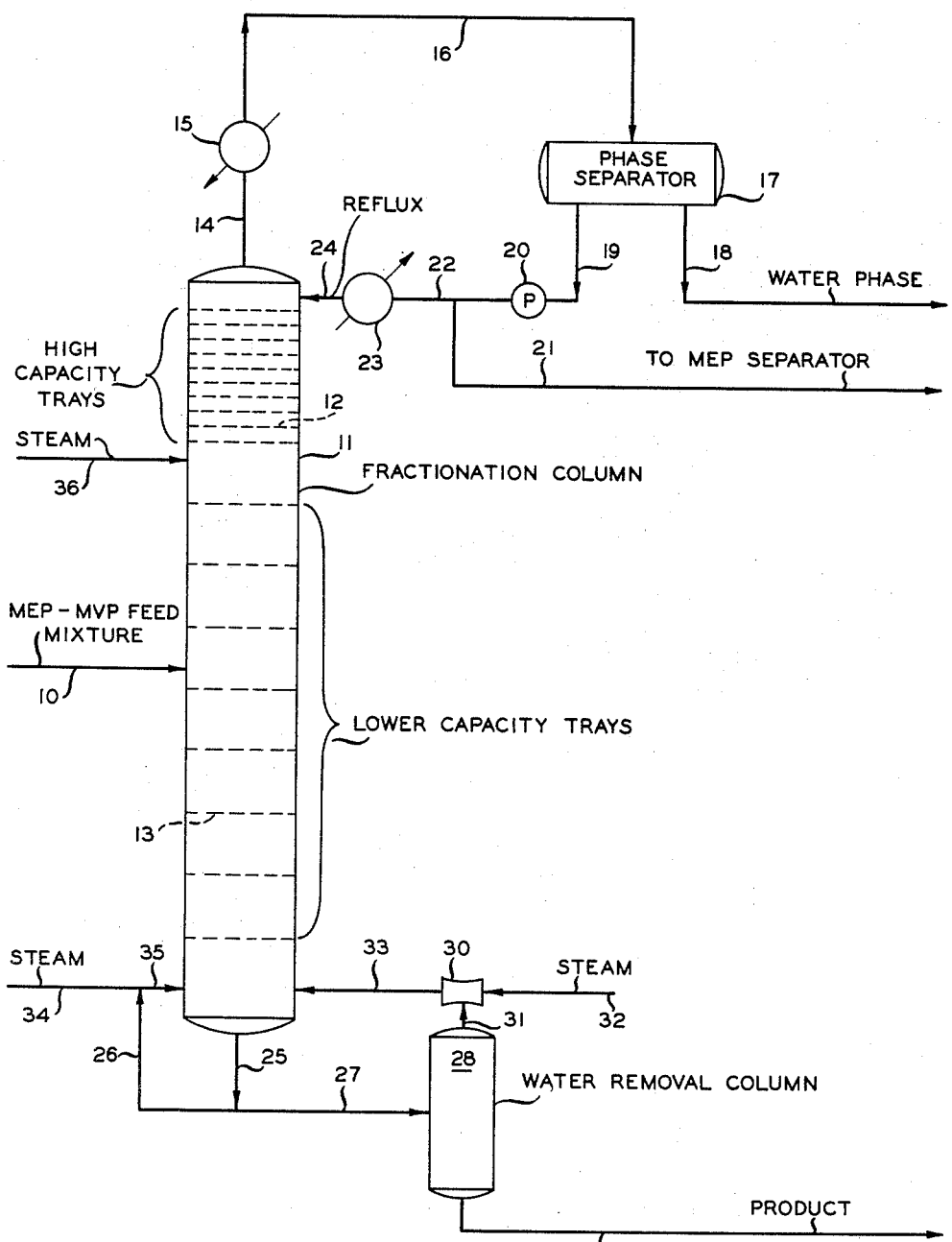

INVENTOR.
H. A. LARSON

INVENTOR.
H. A. LARSON

United States Patent Office 3,151,046
Patented Sept. 29, 1964

3,151,046
METHYLETHYLPYRIDINE-METHYLVINYL-
PYRIDINE FRACTIONATION
Harold A. Larson, Bartlesville, Okla., assignor to
Phillips Petroleum Company, a corporation of
Delaware
Filed May 22, 1959, Ser. No. 815,042
6 Claims. (Cl. 202—46)

This invention relates to an improved method and/or apparatus for the separation of a mixture of distillable organic compounds and, in particular, the invention relates to the fractional distillation of a mixture comprising one or more polymerizable organic compounds.

In accordance with one aspect, this invention relates to a method for improving the separation of an organic feed mixture in a fractional distillation zone having at least one high capacity vapor-liquid contacting section or tray and at least one low capacity vapor-liquid contacting section or tray within said zone, said improvement comprising injecting into said zone a heated fluid medium, such as superheated steam, below a high capacity contacting section. In accordance with another aspect, this invention relates to an improved method for the separation of an organic feed mixture in a fractional distillation zone having high capacity contacting sections in the upper portion of said zone and lower capacity contacting sections in the lower portion of said zone comprising injecting into said zone a heated fluid medium, such as superheated steam, below said high capacity contacting sections and above the low capacity contacting sections to improve the separation efficiency. In accordance with still another aspect, this invention relates to a system for the fractional separation of an organic mixture into an overhead and bottoms product stream comprising, in combination, a fractional distillation column, a plurality of high capacity contacting sections or trays in an upper portion of said column and a plurality of lower capacity trays or contacting sections in a lower portion of said column, and means to inject a heated fluid medium, such as superheated steam, into said column immediately below the lowermost high capacity tray or contacting section.

In the petroleum and petrochemical industries, considerable work has been directed in recent years toward the development of more efficient separation processes. One of the most important aspects of this work concerns improvements in the control of separation processes utilizing fractionation columns so as to obtain product streams of high purity. In attempting to improve the separation efficiency of fractionation columns, for example, many schemes and proposals have been made without appreciable commercial success. In some separation systems, it is often desirable to utilize fractionation trays in a fractionation column of different capacities in order to improve the separation of the feed mixture. However, in such systems, one or the other of the tray sections will become overloaded and, therefore, operate at a low efficiency. The present invention deals with such a system wherein an organic mixture is separated in a fractionation column having high capacity and low capacity trays in the improved manner.

The production of alkenyl pyridines, especially vinylpyridines, has recently become of much industrial importance. Vinylpyridines can be prepared by condensation of formaldehyde with 2- and 4-alkyl pyridines to form the monomethylol compounds followed by dehydration of same to produce corresponding vinylpyridines or substituted vinylpyridines. A more direct procedure is the direct catalytic dehydrogenation of alkyl pyridines to the corresponding alkenyl pyridines. Thus, for example, 2-methyl-5-ethyl pyridine can be efficiently dehydrogenated to produce the corresponding 2-methyl-5-vinylpyridine. This can be done, for example, by passing an admixture of from 2 to 15 weight of steam per weight of 2-methyl-5-ethyl pyridine at a temperature within the range of 1,000 to 1,300° F., approximately atmospheric pressure, and a space velocity of 1 to 5 liquid volumes 2-methyl-5-ethyl pyridine charge per volume of catalyst per hour, overhead catalyst exemplified by one composed of 93 percent iron oxide, 5 percent chromium oxide and 2 percent potassium hydroxide as described and claimed in further detail in U.S. Patent 2,769,811 of John E. Mahan, issued November 6, 1956. The dehydrogenation effluent contains, in addition to hydrogen, principally unchanged 2-methyl-5-ethyl pyridine and 2-methyl-5-vinylpyridine product. Also present are small quantities of pyridine,
2-picoline,
3-picoline,
2,5-lutidine,
3-ethyl pyridine,
3-vinylpyridine.

The purification of vinylpyridines contained in this of other mixtures presents many difficulties. These arise because of the great ease with which vinylpyridines polymerize, the closeness of boiling points between vinylpyridines and the corresponding ethyl pyridines, and the formation of water azeotropes and other difficultly separable fractions on fractional distillation of such mixtures. The present invention is directed to a fractional distillation system, particularly suited for the purification of vinylpyridines contained in the above-described dehydrogenation effluent.

Accordingly, it is an object of this invention to provide an improved method and apparatus for increasing the efficiency of fractionation column contacting trays. In accordance with another object, this invention relates to a fractionation column having high and low capacity trays of improved separation efficiency wherein optimum loading on all trays is achieved. In accordance with another object, this invention relates to a method for improving the efficiency for the separation of organic materials in a fractionation zone having upper high capacity tray sections and lower low capacity tray sections. In accordance with another object, this invention relates to an improved method and apparatus for the separation of organic materials with a minimum of polymerization. In accordance with a further object, this invention relates to an improved fractionation method for the separation of an effluent from a dehydrogenation reactor wherein methylethylpyridine (MEP) is dehydrogenated to methylvinylpyridine (MVP).

Other aspects, objects and the several advantages of this invention are apparent from a study of this disclosure, the drawing and the appended claims.

In accordance with the present invention, an improved method is provided for separating a feed mixture of organic compounds in a fractional distillation zone having at least one upper high capacity vapor-liquid contacting zone or tray and at least one lower low capacity vapor-liquid contacting zone or tray within said distillation zone, said improvement comprising injecting into said distillation zone a heated fluid medium, such as superheated steam, below the high capacity contacting section or tray, thereby increasing the efficiency of the high capacity contacting sections or trays within said distillation zone, and improving the separation of said feed mixture.

More specifically, in accordance with the present invention, an improved method is provided for the separation of a feed mixture of organic compounds, such as the effluent from a methylethylpyridine dehydrogenation unit, into at least two product streams, said feed mixture being introduced into a fractional distillation zone having high capacity vapor-liquid contacting sections or trays in the upper portion of said zone and lower capacity vapor-liquid contacting sections or trays in the lower portion of said zone, said improvement comprising injecting a heated fluid medium, such as superheated steam, into said zone below said high capacity sections and above said lower capacity vapor liquid contacting sections to materially increase the tray efficiencies of said contacting trays or sections within said zone and, thereby improve the overall separation within said zone.

In accordance with a specific embodiment of the present invention, an improved separation method is provided which comprises the steps of introducing an organic feed mixture, such as the effluent from a dehydrogenation reactor wherein methylethylpyridine is dehydrogenated to methylvinylpyridine, said mixture consisting essentially of methylethylpyridine and methylvinylpyridine, into a fractional distillation zone having high capacity trays or contacting sections in an upper portion of said zone and lower capacity trays or contacting sections in the remainder of said zone, withdrawing methylethylpyridine overhead, condensing said overhead to form an organic phase and an aqueous phase, separating said phases, recycling a portion of said organic phase as reflux to said zone, withdrawing methylvinylpyridine as bottoms, recycling a portion of said bottoms to a lower portion of said zone, introducing heat into a lower portion of said zone, and injecting superheated steam into said zone immediately below the lowermost of said high capacity trays to increase the efficiencies of said trays and improve the overall separation within said zone.

The accompanying drawings are diagrammatic illustrations of an arrangement of an apparatus suitable for conducting the present invention. However, the claimed invention is not limited to the illustrations, this being indicative of but one of the various ways in which the present invention may be employed. Referring to FIGURE 1, the figure illustrates a fractionation column in which high capacity trays are in the top of said column and lower capacity trays are in the rest of the column and the feed mixture introduced through an intermediate portion of said column is the effluent from a dehydrogenation reactor wherein methylethylpyridine is dehydrogenated to methylvinylpyridine.

Referring to FIGURE 1, a feed comprising the effluent from an MEP dehydrogenator is passed through conduit 10 and introduced into fractionation column 11 at an intermediate point or portion of column 11. Generally, the feed mixture is introduced into column 11 at about the mid-point of the column. However, it should be realized that the feed point to a column can vary considerably depending upon the feed mixture being passed to the fractionation column. Column 11 may be of any conventional type capable of providing countercurrent contact of liquid and vapors with reflux.

Within fractionation column 11 there is provided a plurality of vapor-liquid contacting trays or sections which are generally spaced over substantially the entire length of the column. High capacity trays 12, such as perforated, slotted, or other dual flow type contacting trays, are provided in the top of fractionation column 11. In the remainder of the column, there are a plurality of lower capacity trays 13, such as a Venturi, Benturi or Kascade type, bubble cap and similar low capacity trays.

Overhead vapors are removed from fractionation column 11 through conduit 14 and are condensed in condenser 15 whereby an organic phase and an aqueous phase result and these two phases are passed by way of conduit 16 into phase separator 17. In phase separator 17 the condensed overhead stream is separated into a water phase, removed from separator 17 by way of conduit 18 and passed to a surge separator tank (not shown) for further treatment. The organic phase is removed from separator 17 by way of conduit 19, passed through pump 20 and divided into two streams, one stream being withdrawn through conduit 21 for MEP recovery, the other portion being recycled to column 11 through conduit 22, heater 23 and reflux conduit 24. The reflux is introduced into the top of column 11 above the high capacity trays 12. If desired, sulfur can be added to the reflux stream, not shown, as a polymerization inhibitor.

A bottoms liquid product comprising MVP is withdrawn from column 11 through conduit 25. The bottoms product stream is divided into two streams, one portion being passed through conduit 26 for recycle to the bottom of column 11 and the other portion is passed through conduit 27 and introduced into water removal column 28 wherein this portion is separated into an MVP product removed from column 28 by way of conduit 29. In water removal column 28, the MVP product is dehydrated under vacuum which is produced by steam ejector 30. Steam is introduced into ejector 30 by way of conduit 32, water being removed from column 28 to conduit 31 and introduced into ejector 30. The steam vacuum producing medium and water removed from column 28 are introduced into the bottom of column 11 through conduit 33 as an additional source of heat.

Superheated steam introduced by conduit 34 is added to the recycle bottoms liquid in conduit 26 to supply heat to fractionation column 11. The addition of the recycle bottoms liquid to the superheated steam and the subsequent injection of the mixture into the fractionator is so arranged as to bring the temperature of the recycle bottoms to the maximum temperature of the system as nearly instantaneously as possible since polymerization of MVP accelerates as its temperature rises. Superheated steam, along with recycle bottoms, is introduced into the base of column 11 through conduit 35. The degree of superheat of this steam can be regulated by a level controller, such as disclosed in U.S. patent 2,769,773, William E. Burns, issued November 6, 1956.

In accordance with the present invention, superheated steam is introduced above the feed tray in column 11 and below the lowermost high capacity tray 12 by way of conduit 36. The superheated steam injected by way of conduit 36 below the high capacity trays functions to materially improve the tray efficiencies of the high capacity trays 12, thereby materially improving the overall separation process. Thus, operating according to the present invention, optimum loading of the high capacity duel flow type trays can be achieved while also maintaining an optimum loading of the lower capacity trays in the lower portion of the column 11.

In the actual operation of the method characterizing the invention, a mixture of predominantly MEP and MVP which comprises the effluent from an MEP dehydrogenator is introduced into column 11 through conduit 10. The fractionator feed mixture contains approximately three times as much MEP as MVP by weight and also contains minor amounts of water, picoline, dimethyl pyridine, and vinylpyridine. Within column 11, vapors disengaged from the feed on the contacting trays pass up through the column while unvaporized residue passes downwardly countercurrent to rising superheated steam introduced in the bottom of column 11. The ultimate unvaporized residue is removed from the bottom of column 11 through conduit 25. The overhead vapors from column 11 comprise steam and organic vapors, predominantly MEP, which are condensed and then separated into an organic and water phase.

The organic layer from the phase separator which is mostly MEP is returned as reflux to the column. The fractionator bottoms are drawn off through conduit 25, a portion of which is recirculated to the bottom of the column and the remainder is passed to water removal column 28.

Fractionating column 11 is operated at subatmospheric pressure, generally about 130 mm. mercury absolute pressure, at the top of the column. The temperature at the top of the column is generally about 130° F. while the temperature at the bottom of the column is about 190° F. The pressure at the bottom of the column is about 265 mm. mercury absolute. The temperature maintained in phase separator 17 ranges from about 95 to 100° F. while the reflux temperature is generally about 145° F. The amount of reflux returned to column 11 will depend upon the amount of superheated steam injected by way of conduit 36. The external reflux introduced by conduit 24 should be increased proportionally with the amount of steam injected by way of conduit 36. Thus, with no steam injection through conduit 36, the external reflux rate is about 15 g.p.m. whereas it is about 30 g.p.m. with 8,000 pounds per hour steam injection through conduit 36.

Figure 2:
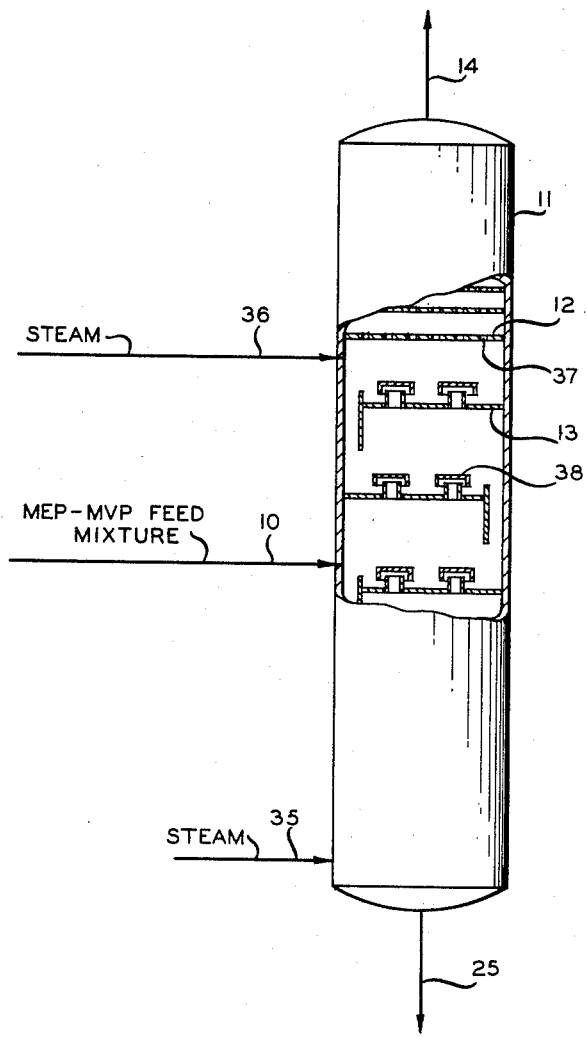

FIGURE 2 illustrates fractionating column 11 with a portion of the column cut away to show the position of the higher and lower capacity trays. Column 11 is provided with trays 12 having perforations 37 in an upper portion of the column and trays 13 having bubble caps 38 in the remainder of the column. A feed mixture is introduced into column 11 by way of line 10 and fractionated within column 11. A vapor stream is removed by line 14 and a bottoms fraction by way of line 25. Stripping steam is introduced into the base of column 11 by way of line 35. Steam is also introduced by way of line 36 into column 11 immediately below the lowermost tray 12.

A more comprehensive understanding of the invention may be obtained by referring to the following illustrative example which is not intended, however, to be unduly limitative of the invention.

EXAMPLE

A fractional distillation column similar to that illustrated in the drawing was utilized to separate an MEP–MVP feed mixture into an overhead MEP fraction and a bottoms MVP fraction. The column contained 101 Koch Benturi trays in the lower part of the column and 15 dual flow type trays in the top of the column. The MEP–MVP feed mixture was introduced into the column on the 60th Benturi tray from the bottom of the column. The top of the column was maintained at a temperature of 131° F. and 132 mm. mercury absolute pressure. The bottom of the column was maintained at a temperature of 188° F. and 265 mm. mercury pressure absolute.

Forty (40) to 60 gallons per minute of the fractionator bottoms were returned to the bottom of the column along with 14,000 pounds per hour of 550° F. superheated steam. Condensed MEP was returned as reflux to the top of the column at the rate of about 15 g.p.m. and 144° F. with no steam addition between tray 101 and tray 102. With steam addition between these trays, MEP reflux was returned to the column at the rate of 29 g.p.m.

In accordance with the present invention, 8,000 pounds per hour of 150 p.s.i.g. and 490° F. steam were injected between tray 101 and tray 102 in the column. An average of the results obtained in testing the tray efficiencies for the high capacity trays in the column, according to conventional procedure and in accordance with the present invention, with and without steam injection under the high capacity trays, and above the low capacity trays, are tabulated in Table I.

*Table*

[Tray efficiencies (percent)]

|  | A<br>Without Steam Injection | B<br>With Steam Injection |
|---|---|---|
| High capacity dual flow trays | 7.2 | 16.9 |

From the above tabulation, it can be readily seen that the tray efficiencies of the dual flow trays were substantially increased by the practice of the present invention wherein the efficiency was increased from 7.2 to 16.9.

While the method has been described as applied to the separation of liquid mixtures of MEP and MVP, the process would be operable in any fractional distillation wherein it is desired to separate a multicomponent feed mixture in an improved manner by increasing the efficiency of the trays within the separation column. As discussed above, the high capacity trays should be in the top of the column and the steam addition should be above the feed tray and immediately below the lowermost high capacity dual flow tray. Also, in the separation of feed mixtures not tending to polymerize wherein steam injection is not required in the bottom of the column, other sources of heat addition to the column may be used, such as reboiler, etc.

Reasonable variation and modification are possible within the scope of the foregoing disclosure, drawing and the appended claims to the invention, the essence of which is the efficiency of the contacting sections or trays within a fractionation zone having at least one upper high capacity vapor-liquid contacting section or tray and at least one lower, low capacity vapor-liquid contacting section or tray is materially increased by injection of a heated fluid medium, such as superheated steam, below said high capacity contacting section and above said lower capacity contacting section within said zone, thereby improving the overall separation of the feed mixture passed to said zone.

I claim:

1. A method for separating a feed mixture of organic compounds into two product streams which comprises passing said feed mixture to an intermediate portion of a fractional distillation zone having a plurality of spaced high capacity vapor-liquid dual flow contacting tray sections in the top part of said zone and a plurality of spaced lower capacity vapor-liquid contacting tray sections in the remainder of said zone, all of said dual-flow tray sections extending across the entire cross-section of said zone so that vapors passing upwardly through said zone pass through the tray sections and contact liquid thereon, withdrawing a vaporous product from an upper portion of said zone, withdrawing an unvaporized bottoms product from the lower portion of said zone, returning a portion of said vaporous product to an upper portion of said zone and a portion of said bottoms to a lower portion of said zone, introducing heat into a lower portion of said zone by injection of superheated steam, and injecting a heated fluid medium into an upper portion of said zone above the feed point and immediately below the lowermost of said high capacity tray sections to improve the separation of said mixture by increasing the tray efficiencies of said contacting sections in said zone.

2. A method for separating a feed mixture consisting essentially of methylethylpyridine and methylvinylpyridine which comprises passing said feed mixture to an intermediate portion of a fractional distillation zone having a plurality of spaced high capacity vapor-liquid dual-flow contacting tray sections in the top part of said zone and a plurality of spaced lower capacity vapor-liquid contacting tray sections in the remainder of said zone, all of said dual-flow tray sections extending across the entire cross-section of said zone so that vapors passing upwardly through said zone pass through the tray sections and contact liquid thereon, said zone being maintained at elevated temperature and subatmospheric pressure, withdrawing methylethylpyridine as overhead vapors, condensing said overhead vapors to form aqueous and organic phases, separating said phases, recycling a portion of said organic phase as reflux to said zone, withdrawing methylvinylpyridine as bottoms, returning a portion of said bottoms to a lower portion of said zone, injecting superheated steam into a lower portion of said zone as a source of heat and to countercurrently contact downwardly moving unvaporized material, and injecting superheated steam into an upper portion of said zone above the feed point but below the lowermost high capacity tray section and above the uppermost lower capacity tray section to improve the separation of said mixture by increasing the tray efficiencies of said contacting sections within said zone.

3. A method for the separation of a feed mixture of organic compounds in a fractional distillation zone having spaced high capacity vapor-liquid dual-flow contacting trays in an upper portion of said zone and spaced lower capacity vapor-liquid contacting trays in another portion of said zone, all of said dual-flow tray sections extending across the entire cross-section of said zone so that vapors passing upwardly through said zone pass through the tray sections and contact liquid thereon, which comprises injecting a heated fluid medium into said zone immediately below the lowermost high capacity dual-flow contacting tray but above the point of feed introduction into said zone to improve the separation of said feed mixture by increasing the tray efficiencies of said trays.

4. In a method for the separation of an organic compound feed mixture in a fractional distillation zone having a plurality of spaced high capacity vapor-liquid dual-flow contacting tray sections in the top part of said zone and a plurality of spaced lower capacity vapor-liquid contacting tray sections in the remainder of said zone, all of said dual-flow tray sections extending across the entire cross-section of said zone so that vapors passing upwardly through said zone pass through the tray sections and contact liquid thereon, and wherein heat is supplied to the base of said distillation zone by injection of superheated steam, and wherein said feed mixture is introduced into an intermediate portion of said zone, the improvement comprising injecting a heated fluid medium into said zone above the point of feed introduction in said intermediate portion but immediately below the lowermost of said high capacity contacting sections and above the uppermost of said lower capacity contacting trays to improve the separation of said mixture within said zone by increasing the tray efficiencies of said contacting sections.

5. A system for separating an organic feed mixture into two product streams comprising, in combination, a fractionation column; a plurality of spaced high capacity vapor-liquid dual-flow contacting trays extending across the entire cross-section of said column in the top part of said column and a plurality of spaced lower capacity vapor-liquid trays extending across the cross-section of said column in the remainder of said column, said lower and higher capacity trays being so arranged that vapors produced in the lower portion of said column passes through both sets of trays; means to introduce said feed into an intermediate portion of said column; means to withdraw, condense and collect condensed overhead product; means to return a portion of condensed product as reflux to an upper portion of said column; means to withdraw and return a portion of bottom products to a lower portion of said column; means for admitting a heating medium into a lower portion of said column; and means for injecting a heated fluid medium into an upper portion of said column immediately below the lowermost high capacity tray, but above said feed means, to improve the tray efficiencies of said trays within said column.

6. A system for separating an organic feed mixture into two product streams comprising, in combination, a fractionation column; a plurality of spaced perforated dual-flow trays in an upper portion of said column and extending across the entire cross-section of said column; a plurality of spaced bubble-cap trays provided with downcomers extending across the cross-section of said column in the remainder of said column; means to introduce said feed into an intermediate portion of said column; means to withdraw, condense, and collect condensed overhead product; means to return a portion of condensed overhead as reflux to said column; means to withdraw and return a portion of bottoms product to a lower portion of said column; means for admitting a heating medium into the base of said column; and means for injecting superheated steam into an upper portion of said column above said feed means, but immediately below the lowermost of said perforated trays, to improve the tray efficiencies of said trays within said column.

References Cited in the file of this patent

UNITED STATES PATENTS

| | | |
|---|---|---|
| 1,987,097 | Coubrough | Jan. 8, 1935 |
| 2,092,528 | Coubrough | Sept. 7, 1937 |
| 2,342,145 | Isham et al. | Feb. 22, 1944 |
| 2,461,694 | McCubbin et al. | Feb. 15, 1949 |
| 2,581,881 | Pyle et al. | Jan. 8, 1952 |
| 2,611,739 | Otto | Sept. 23, 1952 |
| 2,658,863 | Guala | Nov. 10, 1953 |
| 2,706,708 | Frank et al. | Apr. 19, 1955 |
| 2,713,023 | Irvine | July 12, 1955 |
| 2,769,773 | Burns | Nov. 6, 1956 |
| 2,804,427 | Suriano | Aug. 27, 1957 |